United States Patent [19]

Green

[11] Patent Number: 4,918,978
[45] Date of Patent: Apr. 24, 1990

[54] MEANS AND METHOD FOR DETECTING LEAKS IN TANKS

[76] Inventor: Marion C. Green, 1999 Amidon Suite 208, Wichita, Kans. 67203

[21] Appl. No.: 326,230

[22] Filed: Mar. 20, 1989

[51] Int. Cl.⁵ .............................................. G01M 3/32
[52] U.S. Cl. ....................................... 73/49.2; 405/54
[58] Field of Search ...................... 73/49.2; 405/53, 54, 405/55

[56] References Cited

U.S. PATENT DOCUMENTS

| | | |
|---|---|---|
| 2,924,352 | 2/1960 | Santner et al. .................... 73/49.2 X |
| 4,682,492 | 7/1987 | Green .................................. 73/49.2 |
| 4,787,772 | 11/1988 | Wagner .............................. 73/49.2 X |
| 4,796,676 | 1/1989 | Hendershot et al. ............. 73/49.2 X |

FOREIGN PATENT DOCUMENTS 2534832 2/1976 Fed. Rep. of Germany ....... 73/49.2

*Primary Examiner*—Hezron E. Williams
*Assistant Examiner*—Joseph W. Roskos
*Attorney, Agent, or Firm*—John W. Carpenter

[57] ABSTRACT

A system for detecting leaks in a tank, or the like, comprising an excavation basin including a periphery and defining a generally saucer-like formation with a basin surface with slopes from the periphery. A tank supported by the excavation basin. The tank as a permeation barrier extending from the periphery of the basin excavation and is supported by and conforms to the basin surface of the saucer-like formation. A corrosion curtain is integrally bound to the permeation barrier and defines an upright wall of the tank. Particulate matter is supported by the permeation barrier, and a liquid-impervious liner continuously extends from the top of and down the corrosion curtain upright side wall and across the top of the particulate matter that is being supported by the permeation barrier. An improved liquid leakage receiver is positioned in the particulate matter.

19 Claims, 7 Drawing Sheets

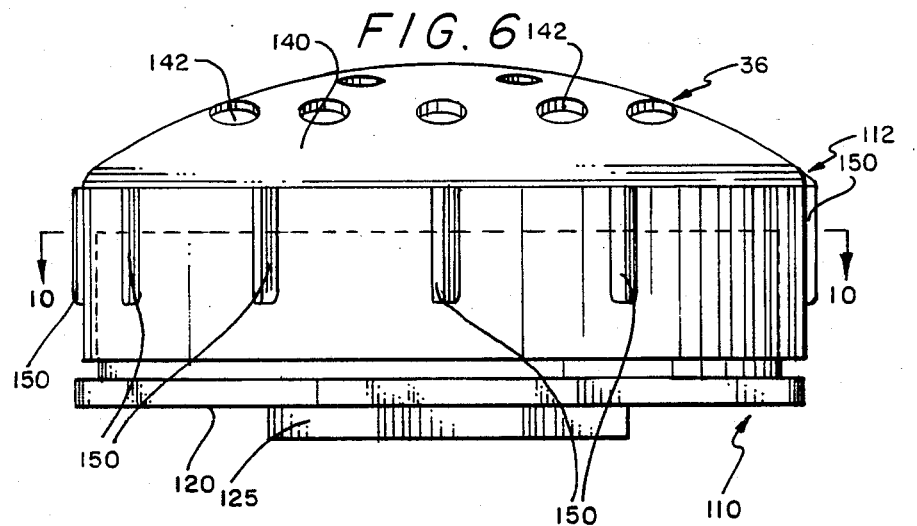
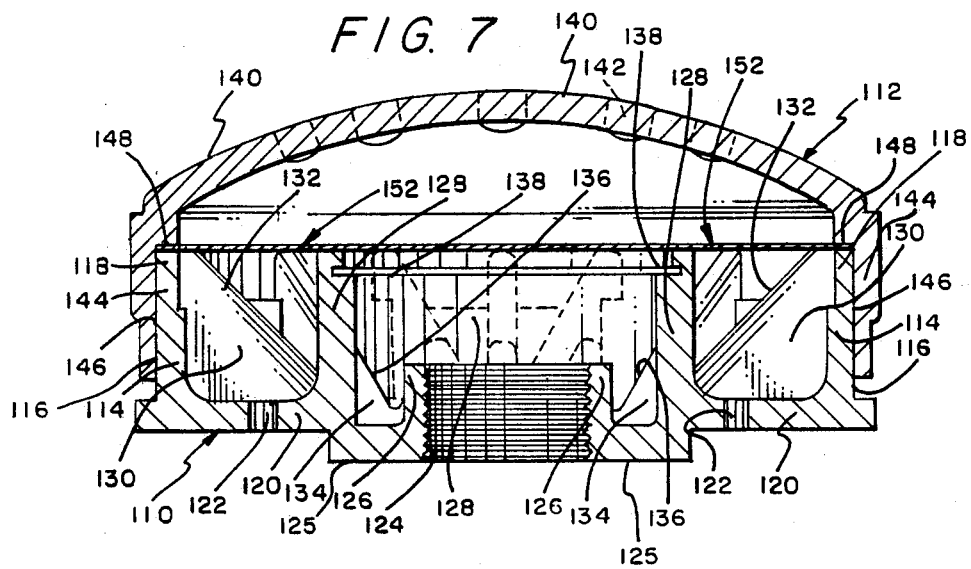
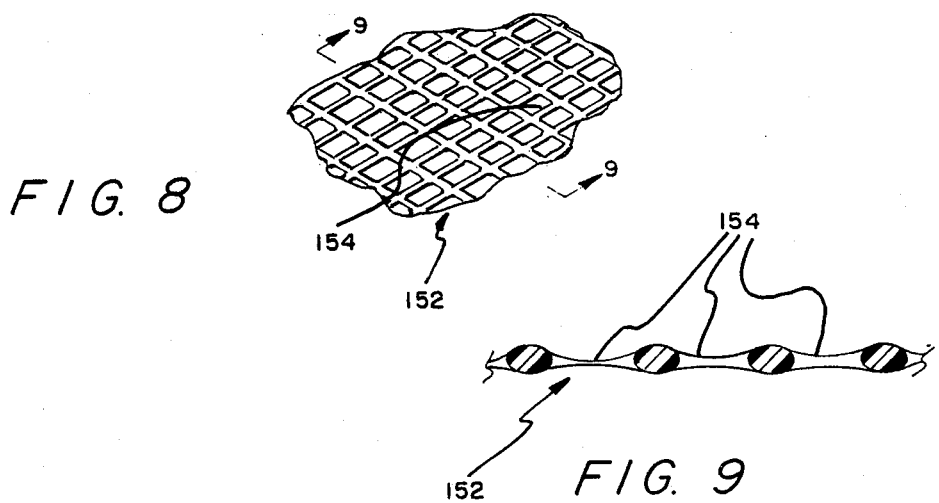

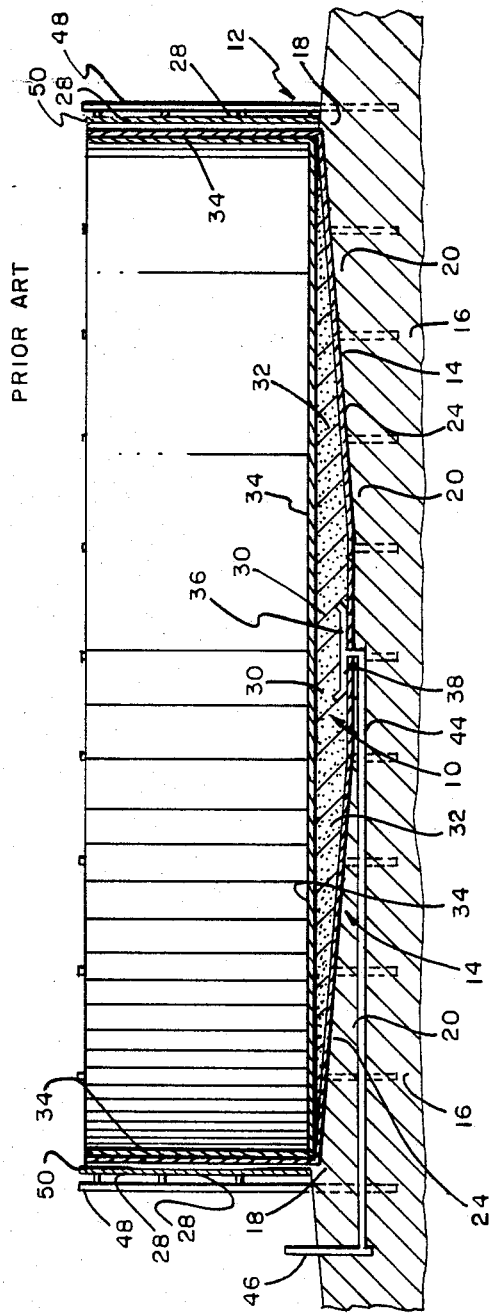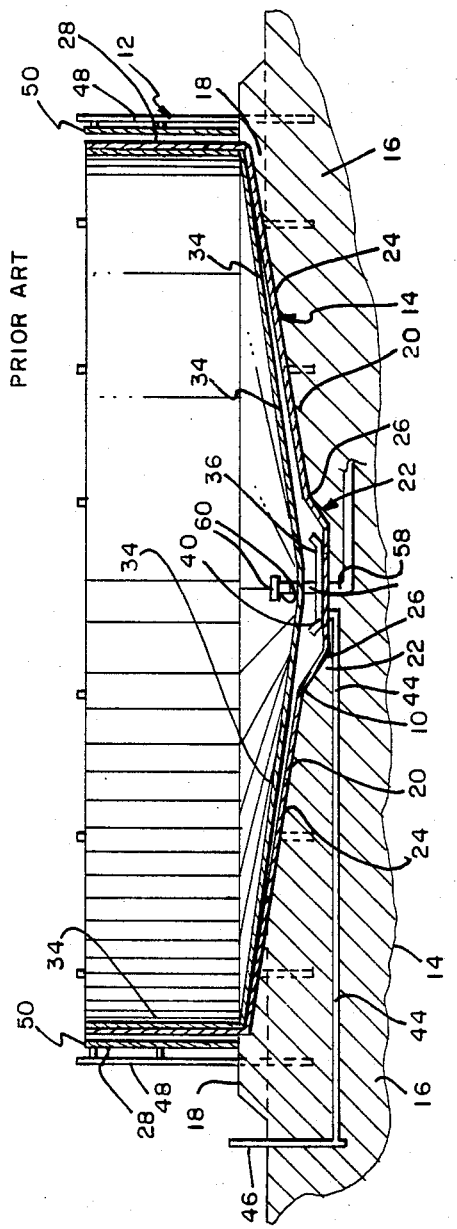

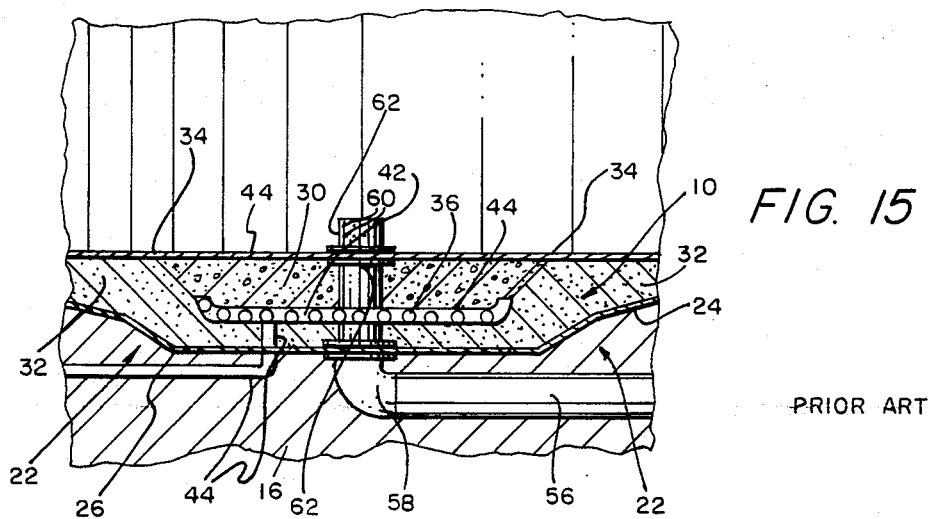
FIG. 15 PRIOR ART
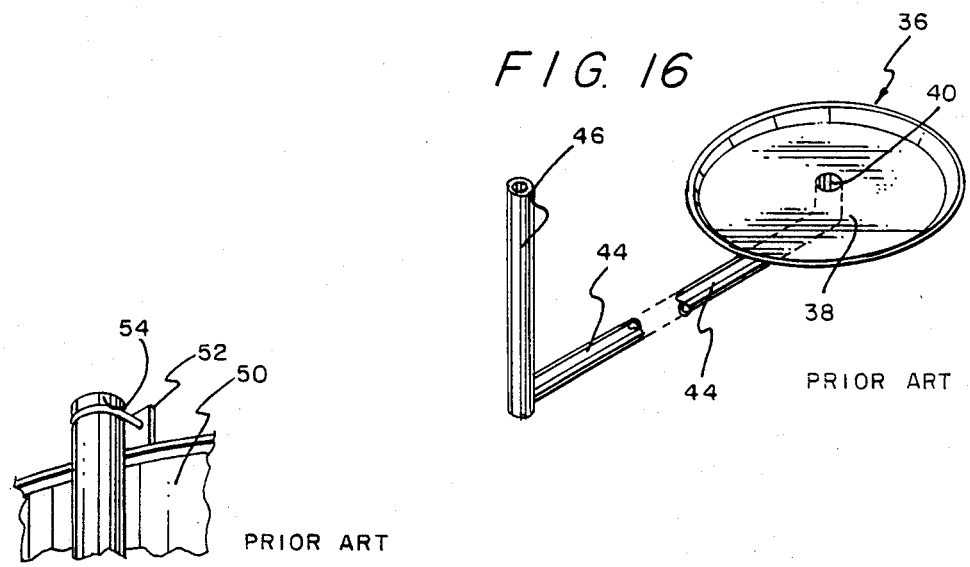
FIG. 16 PRIOR ART
FIG. 17 PRIOR ART
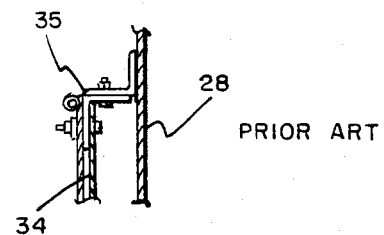
FIG. 18 PRIOR ART

MEANS AND METHOD FOR DETECTING LEAKS IN TANKS

BACKGROUND OF THE INVENTION

1. Field of the Invention

This invention is related to a means and a method for detecting leaks in a tank or the like. More specifically, this invention is related to an improved liquid leakage receiver employed in a system and a method for detecting leaks in a tank that is supported by an excavation basin means.

2. Description of the Prior Art

My U.S. Pat. No. 4,682,492 teaches a means and method for detecting leaks in tanks which employs a liquid leakage receiver that is pan-shaped (as shown in FIG. 6 of the U.S. Pat. No. 4,682,492) or is a monitor pipe having a plurality of apertures (see FIG. 5 of my patent). These liquid leakage receivers are difficult to install and have a tendency to clog up with bottom sediment. My U.S. Pat. No. 4,682,492 is incorporated herein by reference thereto with the same effect as if the entire wording and drawings were reproduced verbatim immediately following. U.S. Pat. Nos. 3,736,754 and 3,943,721 by Azalbert et al. teach a storage facility including a reservoir for the liquids in the form of a lined pit. U.S. Pat. No. 2,940,940 by Barrett discloses a protection method for petroleum storage wherein the petroleum may be stored in a tank disposed in a lined pit. The lined pit has a liner or membrane on which a layer of resin is applied. Any oil leaking from the tank is prevented from entering the ground by means of the impervious membrane. U.S. Pat. No. 4,352,601 by Valiga et al. illustrates a bin for storing hazardous materials wherein the bin has a bottom layer of impermeable cementitious material and below this an impervious film, such as plastic or the like, to prevent any leakage from the storage bin. U.S. Pat. No. 3,505,820 by Draper et al. discloses a reservoir lined with a plastic material. In the event of leakage, the leaking material may collect in the bottom of a pit having a pipe extending upwardly to the surface adjacent the storage reservoir. A sampling container may be inserted through the pipe to the bottom of the pit to collect any material therein which is indicative of a leak in the liner. None of the foregoing prior art teach or suggest the particular system and method for detecting leaks in a tank of this invention, including the improved liquid leakage receiver.

SUMMARY OF THE INVENTION

This invention broadly accomplishes its desired objects by providing a system for detecting leaks in a tank means, or the like.

The system includes an excavation basin means having a periphery and defining a generally saucer-like formation with a basin surface which slopes from the periphery. A tank means is supported by the excavation basin means. The tank means has a permeation barrier means extending from the periphery of the basin excavation means and is supported by and conforms to the basin surface of the saucer-like formation. A corrosion curtain means is integrally bound to the permeation barrier means and defines an upright side wall of the tank means. Particulate matter is supported by the permeation barrier means. A liquid-impervious liner means continuously extends from the top of and down the permeation barrier upright side wall and across the top of the particulate matter that is being supported by the permeation barrier means. A liquid leakage receiver means is positioned in the particulate matter. The liquid leakage receiver means comprises a receiver base having an upstanding solid outside wall, and a perforated top having a depending downwardly extending top solid wall which removably secures to and over the upstanding solid outside wall of the receiver base. The perforated top is arcuate in shape. The receiver base has an upstanding solid inside wall generally concentrically disposed with respect to the upstanding solid outside wall. The receiver base also has a threaded hub which is generally concentric with respect to the upstanding solid outside wall and the upstanding solid inside wall. A monitor conduit means is bound to the threaded hub of the receiver base of the receiver means, and pierces the barrier means, and extends under the excavation basin means outwardly therefrom beyond the periphery of the excavation basin. A leak-check tube means is attached to the monitor conduit means under the ground and projects upwardly therefrom beyond the surface of the ground.

This invention further accomplishes its desired objects by providing a method for detecting leaks in a tank means, or the like, which has a permeation barrier means conforming to the surface of a basin excavation means having a periphery and a corrosion curtain means integrally bound to the permeation barrier means to define an upright side wall of the tank means. The method comprises the steps of:

(a) dispersing particulate matter along the surface of the permeation barrier means;

(b) providing a liquid leakage receiver means comprising a receiver base having an upstanding solid outside wall, and a perforated top having a depending downwardly extending top solid wall which removably secures to and over the upstanding solid outside wall of the receiver base;

(c) positioning the liquid leakage receiver means in the particulate matter;

(d) binding integrally a monitor conduit means to the receiver means of step (c) such that the monitor conduit means pierces the permeation barrier means and extends outwardly therefrom beyond the periphery of the excavation basin means;

(e) lining continuously the corrosion curtain upright side wall and the top of the particulate matter with a liquid-impervious liner means; and (f) detecting any leakage from the tank means through a leak-check tube means that is bound to and in communication with the monitor conduit means.

It is therefore an object of this invention to provide an improved method and an improved system for detecting leaks in a tank, or the like.

It is another object of this invention to provide an improved system and an improved method for detecting leaks in a tank in order to prevent pollution, contamination, and waste.

Still further objects of this invention reside in a provision of a system for detecting leaks in a tank which is relatively inexpensive to manufacture and install.

These, together with the various ancillary objects and features which will become apparent as the following description proceeds, are attained by this invention, preferred embodiments being shown in the accompanying drawings, by way of example only, wherein:

BRIEF DESCRIPTION OF THE DRAWINGS

FIG. 6 is a side elevational view of the liquid leakage receiver;

FIG. 7 is a vertical sectional view taken in direction of the arrows and along the plane of line 7—7 in FIG. 5;

FIG. 8 is a partial perspective view of the filtering screen for the liquid leakage receiver;

FIG. 9 is a vertical sectional view taken in direction of the arrows and along the plane of line 9—9 in FIG. 8;

FIG. 13 is a vertical sectional view taken in direction of the arrows and along the plane of line 13—13 in FIG. 12;

FIG. 14 is a vertical section view of another embodiment of the system for detecting leaks in a tank;

FIG. 15 is a partial enlarged vertical sectional view of the leak detection system for the embodiment of the invention having a sump;

FIG. 16 is a perspective view of the plate and the monitor conduit attached thereto which is also represented in the embodiment of the invention of FIG. 13;

FIG. 17 is a partial perspective view of a top of a support stay post having a protective side wall secured thereto with a bracket; and FIG. 18 is a partial vertical sectional view disclosing a bracket assembly for securing a liquid-impervious liner up and against the corrosion curtain upright side wall.

DETAILED DESCRIPTION OF THE INVENTION

Figure 1:
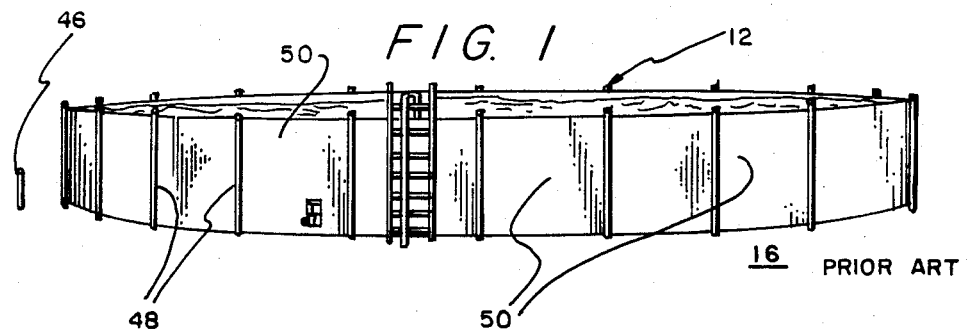
FIG. 1 is a perspective view of a tank.
Figure 2:
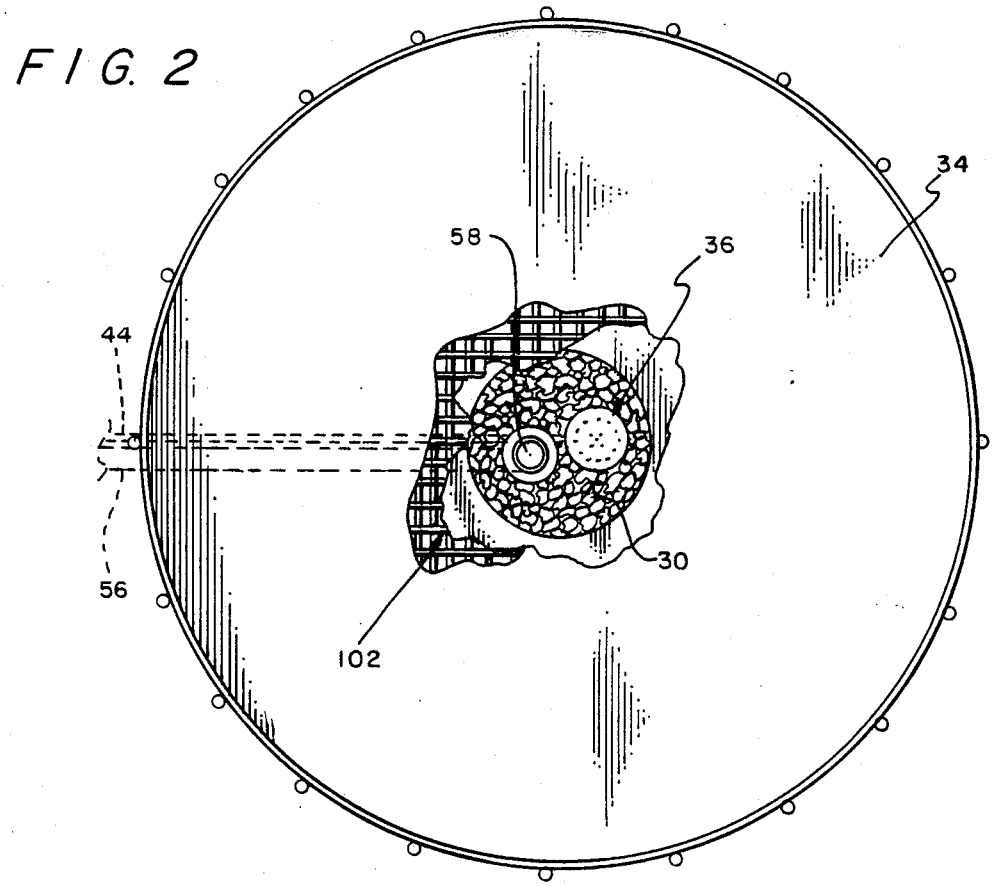
FIG. 2 is a top plan view of one embodiment of the tank with the improved liquid leakage receiver illustrated in a cut-away portion.
Figure 3:
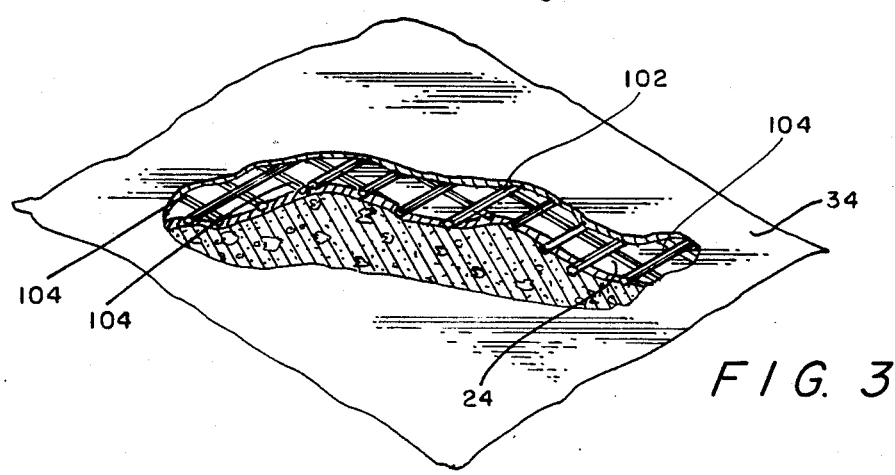
FIG. 3 is a partial perspective view of the netting or reinforcing rods or the like positioned between a liquid-impervious liner and permeation, barrier to facilitate the migration of fluids that have leaked from the tank.

With continuing reference to the drawings for the detailed description of the invention and wherein similar parts of the invention are identified by like reference numerals, there is seen a system generally illustrated as 10, for detecting leaks in a tank, generally illustrated as 12. Initial reference to the drawings will be to FIGS. 12-18 for the invention previously described in my U.S. Pat. No. 4,682,492 which is incorporated herein by reference thereto. Subsequent reference to the drawings will be to FIGS. 1-11 for a description of my improved liquid leakage receiver means which can be employed with the invention in FIGS. 12-18.

As set forth in U.S. Pat. No. 4,682,492, the system 10 has two preferred embodiments. One preferred embodiment is illustrated in FIG. 13 and has a flat bottom, and another preferred embodiment is illustrated in FIG. 14 and has a conical bottom.

Figure 4:
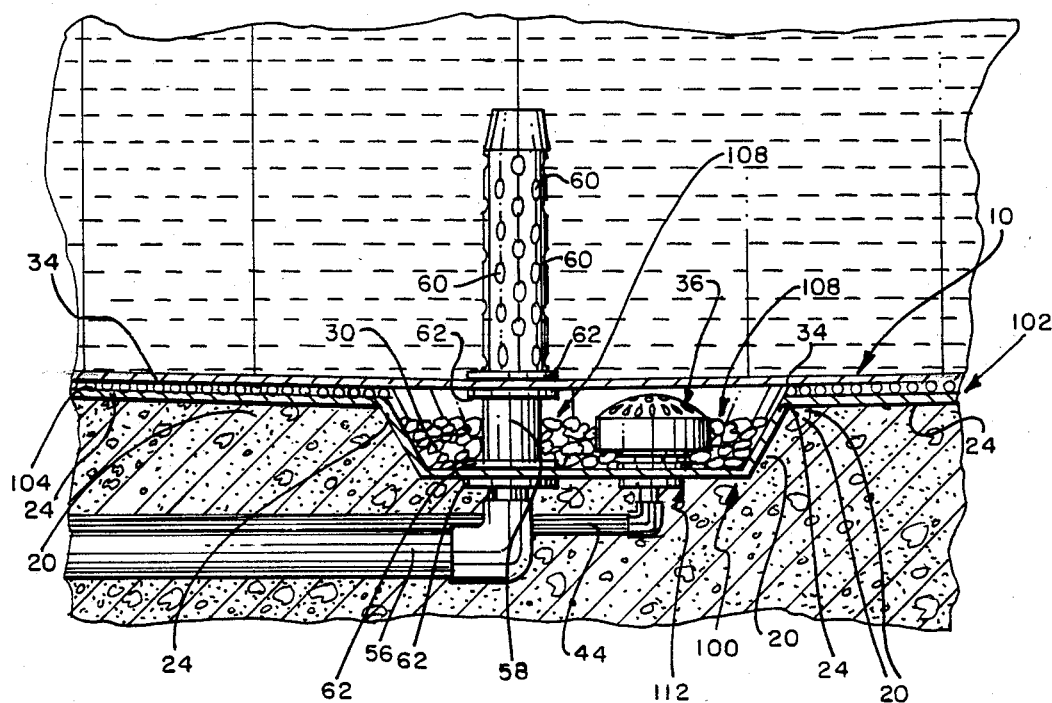
FIG. 4 is a partial enlarged vertical sectional view of the leak detection system for the embodiments having a sump and employing the improved liquid leakage receiver.
Figure 5:
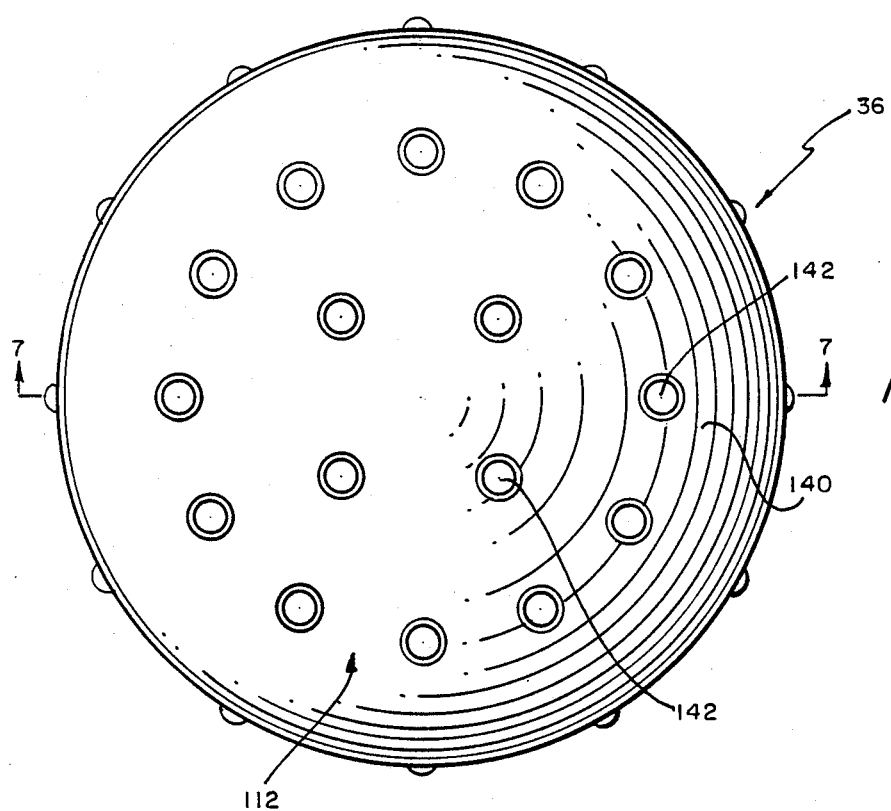
FIG. 5 is a top plan view of the liquid leakage receiver.
Figure 10:
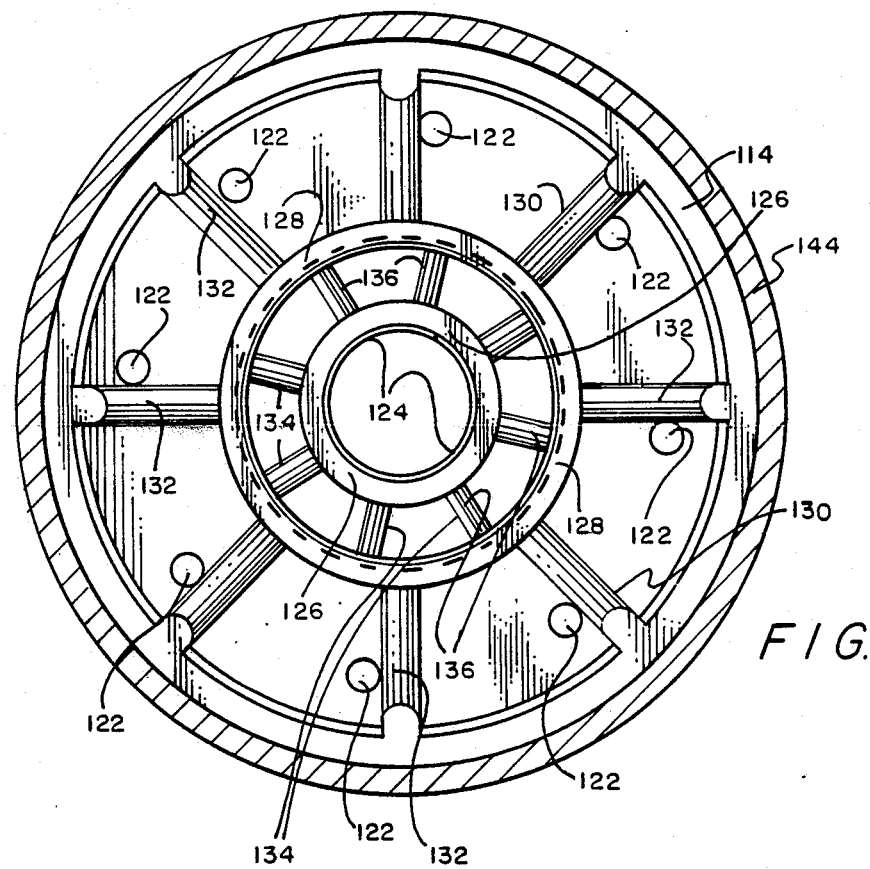
FIG. 10 is a horizontal sectional view taken in direction of the arrows and along the plane of line 10—10 in FIG. 6.
Figure 11:
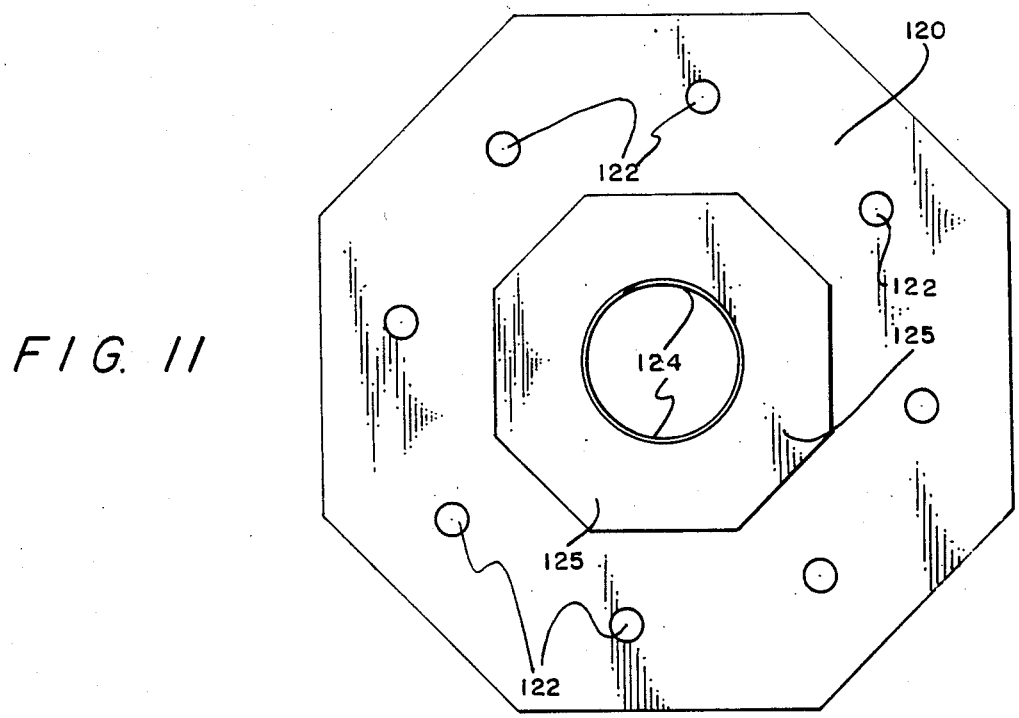
FIG. 11 is a bottom plan view of the base of the liquid leakage receiver.
Figure 12:
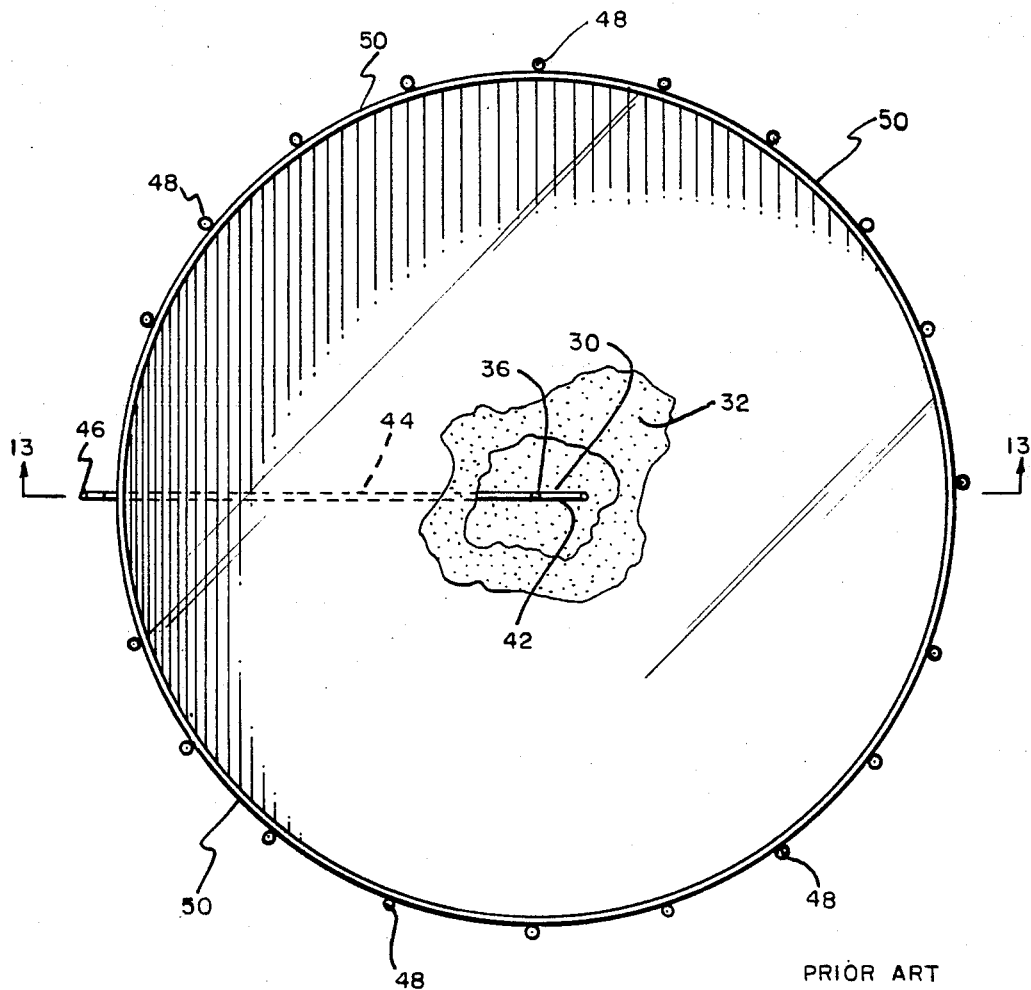
FIG. 12 is a bottom plan view of another embodiment of the tank.

In the two preferred embodiments of the system 10, there is an excavation basin 14 in the ground 16 which supports the tank 12. The basin 14 has a periphery 18, which in the embodiment of FIG. 4 is raised or elevated, and defines a generally saucer-like formation with a basin surface 20 which slopes from the periphery 18 downwardly through the middle of the basin 14. In the preferred embodiment of the system 10 in FIG. 14, basin 14 has a basin sump, generally illustrated as 22.

The tank 12 has a permeation barrier 24 extending from the periphery 18 of the basin 14 to cover the entire surface 20 of the basin 14. Permeation barrier 24 is supported by the basin surface 20 and conforms to the basin surface 20 of the saucer-like formation. In the preferred embodiment of the system 10 in FIG. 14, the permeation barrier 24 has barrier sump 26 that is supported by and conforms to the basin sump 22. A corrosion curtain 28 is integrally bond to the permeation barrier 24 in proximity to the periphery 18 in order to define an upright side wall of the tank 12.

Particulate matter 30 and particulate matter 32 are supported by the permeation barrier 24. Particulate matter 30 has particles of particulate size larger than the particulate matter 32 in order for the particulate matter 32 to have a lower permeability than matter 30. A liquid-impervious liner 34 continuously extends from the top of the corrosion curtain 28, down the upright side wall which the corrosion curtain 28 defines, and across the top of the particulate matters 30 and 32 that are being supported by the permeation barrier 24. The liquid-impervious liner 34 is preferably anchored or secured to the top of the corrosion curtain 28 by the bracket assembly 35 of FIG. 18.

A liquid leakage receiver, generally illustrated as 36, is positioned in the particulate matters 30 and 32. In the preferred embodiment for the system 10 in FIG. 13, receiver 36 is a plate 38 (see FIG. 16) with an aperture 40. In the preferred embodiment for the system 10 in FIG. 14, receiver 36 is a monitor pipe 42 having a structure defining a plurality of apertures 43 (see FIGS. 14 and 15). In both preferred embodiments of the invention, a portion of the particulate matter 32 is additionally positioned below the receiver 36, whether it be the monitor pipe 42 (see FIG. 15) or the plate 38 (see FIG. 13). Similarly, as illustrated in FIGS. 13 and 15, a portion of the particulate matter 30 is positioned above the receiver 36, no matter what embodiment the receiver 36 possesses. The improved liquid leakage receiver 36 of the current invention is illustrated in FIGS. 2-11 and will be fully described below.

A monitor conduit 44 is bound to all embodiments of the receiver 36 (i.e., the plate 38 or the pipe 42 or the improved liquid leakage receiver 36 of FIGS. 2-11) and pierces the permeation barrier 24 (as illustrated in FIGS. 4, 13, 14, and 15) and extends in the ground 16 under the excavation basin 14 outwardly therefrom beyond the periphery 18 of the excavation basin 14. In the embodiment for the receiver 36 illustrated in FIGS. 13 and 16, the monitor conduit 44 supports the plate 38 such that the aperture 40 of plate 38 is in communication with the inside of the monitor conduit 44.

A leak check tube 46 is attached integrally to the monitor conduit 44 under the ground 16 and projects upwardly from the surface thereof as illustrated in FIGS. 1, 12, 13, 14 and 16. The leak-check tube 46 enables a person to look down (or sound) in order to detect for any fluid leakage from the tank 12.

In a preferred embodiment of the invention, a plurality of stay post 48 peripherally surround the excavation basin 14 and are implanted in the ground 16 therearound in proximity to the periphery. A protective side wall 50 is secured to the plurality of stay post 48 and circumferentially surrounds the corrosion curtain 28 side wall. The combination of the stay posts 48 and the protective side wall 50 gives added protection to the surrounding environment in preventing leakage from the tank 12, and protects the surrounding area in the event of a burst in the liner 34 and the corrosion curtain 28. The side wall 50 is protected from corrosion by the liner 34 and the curtain 28. The stay posts 48 are implanted in a concrete embodiment, and may be manufactured of any strong material, but is preferably steel. Side wall 50 may likewise be manufactured of any strong material, but is preferably galvanized steel. Side wall 50 is preferably secured to the stay posts 48 through a kicker plate 52-U bolt 54 assembly of FIG. 17.

In the preferred embodiment of the invention 10 illustrated in FIGS. 4 and 14 and 15, the system 10 additionally comprises a tank underdrain conduit 56 having a conduit end 58 bound thereto and extending through the barrier sump 26 of the permeation barrier 24, through the particulate matters 30 and 32, and through the liquid-impervious liner 34. The section of the riser conduit end 58 extending beyond the liquid-impervious liner 34 has a structure defining a plurality of riser apertures 60. A pair of flanges 62—62 (see FIGS. 4 and 15) circumferentially surrounds the rising conduit end 58 while being bound thereto, and sandwiches the liquid-impervious liner 34 such as to form a liquid-tight seal around the liquid impervious liner 34.

The permeation barrier 24 may be manufactured of any impervious material which is strong enough for its function and non-corrosive to the elements. Suitable materials for the permeation barrier 24 include, but are not limited to galvanized steel and certain plastics. Likewise, the corrosion curtain 28 may also be manufactured of any impervious material which is strong enough for its function, which includes withstanding fluid pressure from within the tank 12, and is also non-corrosive to the elements. Suitable materials for the corrosion curtain 28 also include, but are not limited to galvanized steel and certain plastics. The type of material that the barrier 24 and the curtain 28 is manufactured of is not critical as long as it performs its function which are well-known to those in the art.

The liquid-impervious liner 34 may be manufactured of any impervious material which is impervious, strong and resistant enough to withstand any of the force which any liquid within the tank 12 may impose upon it. In a preferred embodiment of the invention, the liquid impervious liner 34 is manufactured of a malleable flexible impervious material. In a more preferred embodiment or the invention, the liquid-impervious liner 34 is manufactured or constructed of an impervious plastic means selected from the group consisting of, but not limited to, high density polyethylene, polypropylene, polyvinyl fluoride, polyvinyl chloride, polyurethane, and polyethylene terephthalate.

The particulate matters 30 and 32 are in a preferred embodiment of the invention gravel and sand, respectively. However, it is to be understood that the particulate matters 30 and 32 may be any particulate matter which are capable of functioning as a migration pad in the event that there is a liquid leakage from the tank 12 through the liquid-impervious liner 34. A migration pad enables any fluids that leak from tank 12, especially in proximity to the periphery 18 and the corrosion curtain 28 upright side wall, to flow by gravity downwardly from the leakage point through the particulate matter 32, through the particulate matter 30 and into one of the embodiments of the liquid-leakage receivers 36, without preferably flowing underneath one of the receivers 36 or the particulate matter 32 positioned underneath one of the receivers 36. Fluid that leaks from the tank 12 and flows into the particulate matter 32 underneath one of the liquid-leakage receivers will not be detected in the leak-check tube 46.

It is important that the permeability of particulate matter 32 be low enough such that any leakage will have the opportunity of flowing into the particulate matter 30 before flowing onto the top surface of the permeation barrier 24. One of the features of the preferred embodiment of FIGS. 14 and 15 which include the basin sump 22 and the barrier sump 26, which is supported by and conforms to the basin sump 22, is that any fluid leakage is offered an additional opportunity of flowing into particulate matter 30 from particulate matter 32 and into the liquid-leakage receiver 36, before only flowing through the particulate matter 32 to underneath the liquid-leakage receiver 36. In the embodiment of the invention in FIG. 15, the particulate matter 30 is seated in the barrier sump 26, and the particulate matter 32 is additionally positioned in the barrier sump 26 and below the liquid-leakage receiver 36.

As was previously mentioned, particulate matter 30 is preferably gravel. Gravel may include a material mixture of sand, flints and loam each of which preferably includes a particle size having between about 1 mm in diameter or its greatest measurement extremity (e.g. length, circumference, etc.) and about 100 mm in diameter or its greatest measurement extremity.

As was also previously mentioned, particulate matter 32 is preferably sand which may be generally defined to include loose, unconsolidated detrital sediment, consisting essentially of rounded grains of quartz. Sand in sediment petrology is generally restricted to sediments whose grains lie between about 0.1 mm in diameter and about 1 mm in diameter. In the preferred embodiment of the invention, particulate matter 32 is sand having a particle size of between about 0.05 mm in diameter and about 2 mm in diameter; most preferably, the particle size of the sand is the sedementary petrology size, i.e. one having a particle size of between about 0.1 mm in diameter and about 1 mm in diameter.

Referring in detail now to FIGS. 1–11 which utilizes the improved liquid leakage receiver means 36 of FIGS. 2 and 4–11, there is no basin 14 as such, but merely a cup-like excavation, generally illustrated as 100, disposed generally concentrically with respect to the tank 12. Thus, the cup-like excavation 100 defines the basin 14 which for the purposes of FIG. 4 does not extend to or from the periphery of the tank 12. As best illustrated in FIG. 4, permeation barrier 24 extends along the surface of the ground and into and around the cup-like excavation 100. Superimposed on or over the permeation barrier 24 up to cup-like excavation 100 is a netting means or reinforcing rod means 102 or the like (see FIG. 3) which comprises a plurality of tubes or rods 104 overlying with respect to each other in a checker arrangement. The rod means 102 do not extend down into the cup-like excavation 100 to cover the permeation barrier 24 in the cup-like excavation 100. The netting means 102 facilitates the migration of fluids that have leaked from the tanks 12 and is a vast improvement over the employment of particulate matter 30 and/or 32 which is illustrated in FIG. 13. The netting or reinforcing rod means 102 may be of any suitable type, such as that sold under the registered trademark POLY-NET 2000 ® owned by National Seal Company, Chicago, Ill. The liquid-impervious liner 34, as was seen for the embodiment of the invention in FIGS. 13 and 14, continuously extends from the top of the corrosion curtain 28 down the upright side wall which the corrosion curtain defines, and across the top of the reinforcing rod means 102 and over the barrier 24 lined cup-like excavation 100. The bracket assembly 35 of FIG. 18 preferably anchors or secures to the top of the corrosion curtain 28 to the liquid-impervious liner 34. As best illustrated in FIG. 4, P-gravel 30, rocks, or the like, having an average particle size ranging from about ¼ inch to about 3 inches, is supported by the permeation barrier 24 in the cup-like excavation 100. It has been discovered that such size rocks and/or gravel 30 perform better than sand having a smaller size. It has also been discovered that an air space 108 between the top of the gravel/rocks 30 and the bottom of the permeation barrier 24 produces better liquid leakage receiving results than without any air space 108. As was similarly seen for the invention illustrated in FIGS. 14 and 15, the system 10 in FIG. 4 additionally comprises the tank underdrain conduit 56 having the conduit end 58 bound thereto and extending through the cup-like excavation 100 of the permeation barrier 24, through the particulate matter 30, and through the liquid-impervious liner 34. The section of the riser conduit end 58 extending beyond the liquid-impervious liner 34 has a structure defining a plurality of riser apertures 60. Two sets of a pair of flanges 62—62 (see FIG. 4) circumferentially surround the rising conduit end 58 while being bound thereto, and sandwiches the liquid-impervious liner 34 and the permeation barrier 24 such as to form a liquid-tight seal around the permeation barrier 24 and the liquid impervious liner 34, respectively. While a preferred system 10 for the improved liquid leakage receiver 36 of FIGS. 2-11 is that depicted in FIG. 4, it is to be understood that the improved liquid leakage receiver 36 of FIGS. 2-11 may be employed in the systems 10 of FIGS. 13 and 14. Thus, the invention includes the use of the improved liquid leakage receiver 36 for the systems in FIGS. 13 and 14.

Referring in detail now to FIGS. 6-11 for an accurate description of the improved liquid leakage receiver 36, there is seen the improved receiver 36 comprising a circular receiver base, generally illustrated as 110, which supports a circular receiver top, generally illustrated as 112, that is slidably disposed thereon. The receiver base 110 has an upstanding circular solid outside wall 114 with an outer surface 116 and a top 118. A receiver floor 120 is integrally bound to the outside wall 114. The receiver floor 120 has a plurality of floor apertures 122 disposed therethrough, and is formed with a threaded hub 124 having a hub base 125 and a circular upstanding hub wall 126 concentrically disposed with respect to the solid outside wall 114. The receiver base 110 additionally comprises an upstanding circular solid inside wall 128 generally concentrically disposed with respect to the upstanding solid outside wall 114. A plurality of outside partition members 130 is bound to the outside wall 114 and to the inside wall 128 and has a sloping surface 132 that slopes from the outside wall 114 to the inside wall 128. A plurality of inside partition members 134 is bound to the inside wall 128 and to the hub wall 126 and has a sloping surface 136 sloping from the inside wall 128 down to the hub wall 126. The upstanding circular inside wall 128 is formed with a circular recess 138. The circular receiver top 112 has an arcuate surface 140 and a plurality of top apertures 142. The receiver top 112 is formed with a depending solid top wall 144 extending downwardly and having an inner surface 146. The solid top wall 144 is formed with a shoulder 148. The depending solid top wall 144 is lined at regular intervals with a plurality of downwardly extending ribs 150. A perforated screen means 152 having screen apertures 154 is disposed over the entire receiver base 110. More specifically, the screen means 152 rests on top of the solid inside wall 128 and the solid outside wall 114 and is lodged or sandwiched between the shoulder 148 of the solid top wall 144 and the top 118 of the solid outside wall 114 when the receiver top 112 is slidably disposed over the receiver base 110 such that the outer surface 116 of the outside wall 114 is in contact with the inner surface 146 of the solid top wall 144.

With continuing reference to the drawings for operation of the invention and the method of detecting leaks in a tank 12 depicted therein, the particulate matters 30 and 32 are dispersed along the top surface of the permeation barrier 24, including the barrier sump 26 for the preferred embodiment of FIGS. 14 and 15. Depending on the preferred embodiment of the system 10, one of the embodiments of the liquid-leakage receiver 36 is positioned in (or between) the particulate matters 30 and 32, as illustrated in FIGS. 13, 14 and 15. With respect to the system 10 depicted in FIG. 4, only particulate matter 30 is employed with the air space 108 between the top of the particulate matter 30 and the bottom of the liquid-impervious liner 34. The monitor conduit 44 has been bound to one of the embodiments of the liquid-leakage receiver 36 such that the monitor conduit 44 pierces the permeation barrier 24 for the preferred embodiment of FIG. 13, or the barrier sump 26 for the preferred embodiment of FIGS. 14 and 15, or the cup-like excavation 100 (including the liquid-impervious liner 34) for the preferred embodiment of FIG. 4. In either embodiment, the monitor conduit 44 is to extend outwardly in the ground 16 from the excavation basin 14 until it is beyond the periphery 18 of the basin 14. The liquid-impervious liner 34 is attached to the top of the corrosion curtain 28 in accordance with bracket assembly 35 of FIG. 18, and extends down the upright side wall of the corrosion curtain 28 to line the same and cover the top of the particulate matters 30 and 32.

Leak-check tube 46 is connected to an end of the monitor pipe 44 and protrudes upwardly from the surface of the ground in order for any person to detect any leakage from the tank 12.

The leak-check tube 46 is in communication with the inside of the monitor conduit 44 and any fluids that leak from the tank 12 through the liquid-impervious liner 34 and into the particulate matter 30, eventually gravity flows into one of the liquid-leakage receivers 36 wherein it is dispersed into the monitor conduit 44 for detection through the leak-check tube 46. Any fluids that leak from the tank 21 through the liquid-impervious liner 34 and into the particulate matter 32, flow by gravity through the particulate matter 32 and into the particulate matter 30, and further into one of the liquid-leakage receivers 36 wherein again it is dispersed into the monitor conduit 44 either through aperture 40 of plate 38 or apertures 44 of the conduit pipe 42, for detection with the leak-check tube 46. In the embodiment of the invention in FIG. 4, any fluids that leak from the tank 21 through the liquid-impervious liner 34, flow around and/or over the netting means or reinforcement rod means 102 and into the cup-like excavation 100 lined with permeation barrier 24. The fluids gradually percolate or trickle through particulate matter 30. One of the salient features of this invention is that the outside wall 114 of the receiver base 110 and the solid top wall 144 are solid; thus, no leaking fluids enter the improved leakage receiver 36 until flowing over the arcuate surface 140 and through apertures 142. This is to prevent any bottom sediment within the leaking fluids from clogging up the improved leakage receiver 36. It should be understood that, as was previously mentioned, the improved leakage receiver 36 of FIGS. 2-11 may be employed in the systems 10 of FIGS. 13 and 14. Therefore, the reinforcement rod means 102 may be positioned between the liner 34 and the barrier 24, and the improved receiver 36 may replace the receivers 36 of FIGS. 13 and 14. Preferably, when the receiver of FIGS. 2-11 is employed, there is an air space 108 between the liner 34 and the barrier 24. The screen means 152 filters or screens out any bottom sediment/sludge or the like that might seep through apertures 142 of the arcuate surface 142.

In the preferred embodiment of FIGS. 4 and 14 and 15, the tank underdrain conduit 56 is laid underneath the excavation basin 14. The riser conduit end 58 has been connected to the tank underdrain conduit 56 and extends through the barrier sump 26 of the permeation barrier 24 (or the cup-like excavation 100 and barrier 24 in FIG. 4), through the particulate matters 30 and 32 (or only particulate matter 30 in FIG. 4), and through the liquid-impervious liner 34. The flanges 62—62, that are bound to the riser conduit end 58, sandwich in the liquid-impervious liner 34 in order to prevent leakage in this connection area. In FIGS. 4 and 15, flanges 62—62 also sandwich permeation barrier 24. The section of the riser conduit end 58 that extends beyond the liquid-impervious liner 34 has a structure defining the plurality of riser apertures 60. The tank underdrain conduit 56 enables one to drain any fluid from within the tank 12 through the riser apertures 60 by merely opening a valve (not shown in the drawings).

Thus by the practice of this invention there is provided a positive prevention of pollution, contamination and wastes. This invention further prevents percolation in all types of seals, from clay to sand. The design of this invention includes the migration sand pad (of particulate matters 30 and 32) between the liquid impervious liner 34 and the permeation barrier 24 to permit easy and unrestricted flow of any fluids to one of the embodiments of the liquid-leakage receiver 36. The design of this invention also includes a general permeation barrier to all areas of the fluid impounded, including the upright side walls defined by the corrosion curtain 28. The corrosion curtain 28 prevents any corrosion to the side walls 50 while simultaneously assists in conducting any leaked fluid to the liquid-leakage receiver 36. The permeation barrier 24 also assists in conducting any leaked fluid to the liquid-leakage receiver 36 while simultaneously defining a liner for the excavation basin 14.

While the present invention has been described herein with reference to particular embodiments thereof, a latitude of modification, various changes and substitutions are intended in the foregoing disclosure, and will be appreciated that in some instances some features of the invention will be employed without a corresponding use of other features without departing from the scope of the invention as set forth.

I claim:

1. A system for detecting leaks in a tank, or the like, comprising an excavation basin in a ground having a surface and including a periphery and defining a generally saucer-like formation with a basin surface which slopes from said periphery;

tank supported by said excavation basin, said tank having a permeation barrier extending from the periphery of the basin excavation and supported by and conforming to the basin surface of the saucer-like formation, an impervious corrosion curtain integrally bound to said permeation barrier at the periphery of the basin and defining an upright side wall of the tank, particulate matter supported by said permeation barrier, a liquid-impervious liner continuously extending from the top of and down said corrosion curtain up-right side wall and across the top of the particulate material that is being supported by the permeation barrier;

liquid-leakage receiver positioned in said particulate matter; said liquid-leakage receiver comprising a receiver base having a solid outside wall, a solid inside wall generally concentrically disposed with respect to said solid outside wall, and a hub generally concentrically disposed with respect to said solid outside wall and said solid inside wall;

monitor conduit bound to said receiver and piercing the barrier and extending under the excavation basin outwardly therefrom beyond the periphery of said excavation basin;

and a leak-check tube attached to said monitor conduit under the ground and projected upwardly therefrom beyond the surface of the ground.

2. The system of claim 1 additionally comprising a tank underdrain conduit including a riser conduit end extending through said permeation barrier, through said particulate matter, and through said liquid-impervious liner said section of said riser conduit end extending beyond the liquid-impervious liner having a structure defining a plurality of riser apertures;

a pair of flanges circumferentially surrounding said riser conduit end and sandwiching said liquid-impervious liner such as to form a liquid-tight seal around said liquid-impervious line.

3. The system of claim 1 wherein said liquid leakage receiver, means comprises a monitor pipe means having a structure defining a plurality of apertures.

4. The system of claim 1 wherein said leaking receiver comprises a plurality of first partition having a first sloping surface, said first partition connected to said solid outside wall and said solid inside wall and said first sloping surface slopes from said solid outside wall to said solid inside wall.

5. The system of claim 4 additionally comprising a plurality of second partition means having a second sloping surface, said second partition means connected to said solid inside wall and said hub means and said second sloping surface slopes from said solid inside wall to said hub means.

6. The system of claim 1 wherein said excavation basin additionally comprises a basin sump at the bottom of said basin surface, and said permeation barrier additionally comprises a barrier sump support by and conforming to the basin sump.

7. The system of claim 1 wherein said leakage receiver comprises a receiver floor having a structure defining a plurality of floor apertures.

8. The system of claim 7 wherein said leakage receiver additionally comprises a receiver top slidably disposed over the receiver base and having a structure defining a plurality of top apertures.

9. The system of claim 8 wherein said receiver top has an arcuate top surface.

10. The system of claim 1 additionally comprises a plurality of stay post peripherally surrounding said excavation basin and implanted in the ground therearound;
   protective side wall secured to said plurality of stay post and circumferentially surrounding said corrosion curtain upright side wall.

11. The system of claim 1 wherein said liquid-impervious liner comprises impervious plastic selected from the group consisting of high-density polyethylene, polypropylene, polyvinyl fluoride, polyvinyl chloride, polyurethane, and polyethylene terephthalate.

12. The system of claim 1 wherein said excavation basin includes an elevated periphery.

13. A method for detecting leaks in a tank, or the like comprising a permeation barrier conforming to the surface of a basin excavation having a periphery and an impervious corrosion curtain integrity bound to the permeation barrier at the periphery of the basin to define an upright side wall of the tank, said method comprising the steps of:
   (a) dispersing particulate matter along the surface of said permeation barrier;
   (b) positioning a liquid leakage receiver means in said particulate matter for receiving liquid that has leaked from the tank;
   (c) binding integrally a monitor conduit to said receiver of step (b) such that said monitor conduit pierces the permeation barrier and extends outwardly therefrom beyond the periphery of the excavation basin;
   (d) lining continuously the corrosion curtain upright side wall and top of the particulate matter with a liquid-impervious liner;
   (e) disposing a netting means between the permeation barrier and the liquid-impervious liner to facilitate the migration of liquid that has leaked from the tank; and
   (f) detecting any leakage from the tank through a leak-check tube that is bound to and in communication with the monitor conduit.

14. A liquid leakage receiver comprising
   a receiver base having an outside wall, and a hub generally concentrically disposed with respect to said outside wall; and
   a receiver floor bound to said outside wall and having a structure defining a plurality of floor apertures; and
   a receiver top slidably disposed over the receiver base and having a structure defining a plurality of top apertures.

15. The liquid leakage receiver of claim 14 additionally comprising a perforated screen disposed over the receiver base and underneath said receiver top.

16. The liquid leakage receiver of claim 14 additionally comprising an inside wall generally concentrically disposed with respect to said outside wall and bound to said receiver floor.

17. The liquid leakage receiver of claim 14 additionally comprising a monitor conduit engaged to said hub.

18. The liquid leakage receiver of claim 14 additionally comprising an inside wall generally concentrically disposed with respect to said outside wall and bound to said receiver floor, and a perforated screen disposed over the receiver base and underneath said receiver top.

19. The liquid leakage receiver of claim 18 additionally comprising a plurality of first partitions with each having a first sloping surface, said first partitions connected to said outside wall and said inside wall and said first sloping surface slopes from said outside wall to said inside wall; and a plurality of second partitions with each having a second sloping surface, said second partitions connected to said inside wall and said hub and said second sloping surface slopes from said inside wall to said hub.

* * * * *